(12) United States Patent
Hennig (10) Patent No.: US 9,232,695 B1
(45) Date of Patent: *Jan. 12, 2016

(54) ROUND BALE MOVER

(71) Applicant: Emmett D. Hennig, Decatur, NE (US)

(72) Inventor: Emmett D. Hennig, Decatur, NE (US)

( * ) Notice: Subject to any disclaimer, the term of this patent is extended or adjusted under 35 U.S.C. 154(b) by 65 days.

This patent is subject to a terminal disclaimer.

(21) Appl. No.: 14/194,974

(22) Filed: Mar. 3, 2014

Related U.S. Application Data (63) Continuation-in-part of application No. 13/890,700, filed on May 9, 2013, now Pat. No. 9,043,958, which is a continuation of application No. 12/927,073, filed on Nov. 5, 2010, now Pat. No. 8,444,362.

(51) Int. Cl.
*B65G 67/02* (2006.01)
*A01D 87/12* (2006.01)

(52) U.S. Cl.
CPC ............ *A01D 87/127* (2013.01); *A01D 87/122* (2013.01)

(58) Field of Classification Search
CPC .............. A01D 87/127; A01D 87/122; A01D 2087/128; A01D 87/0061; A01D 87/126; A01D 90/08; B66F 9/18; B66F 9/08; B66F 9/082; B66F 9/085; B66F 9/20; Y10S 241/605; Y10S 414/124; Y10S 414/133
USPC ............... 414/111, 24.5, 24.6, 540, 546, 547, 414/551, 552, 555, 910, 911
See application file for complete search history.

(56) References Cited

U.S. PATENT DOCUMENTS

| 2,896,805 | A | | 7/1959 | Rigsby |
| 3,934,726 | A | | 1/1976 | Martin |
| 4,091,947 | A | | 5/1978 | Fischer |
| 4,120,405 | A | | 10/1978 | Jones et al. |
| 4,360,167 | A | * | 11/1982 | Beccalori et al. ............. 241/274 |
| 4,395,189 | A | | 7/1983 | Munten |
| 5,074,733 | A | | 12/1991 | Hennig |
| 7,182,568 | B2 | | 2/2007 | McGinnes |
| 7,753,636 | B2 | | 7/2010 | Hennig |
| 8,444,362 | B2 | * | 5/2013 | Hennig ........................ 414/24.5 |
| 9,043,958 | B1 | * | 6/2015 | Hennig |
| 2003/0123956 | A1 | | 7/2003 | Noualy |
| 2010/0040436 | A1 | * | 2/2010 | Bruha .................. A01D 87/122 414/24.5 |

FOREIGN PATENT DOCUMENTS

| DE | 4142613 | | 6/1993 | |
| DE | 10127949 | | 12/2002 | |
| FI | EP 2647280 | A1 * | 10/2013 | ........... A01D 87/122 |
| JP | 296422 | | 10/1994 | |
| WO | WO 8906499 | | 7/1989 | |

* cited by examiner

*Primary Examiner* — Gregory Adams
(74) *Attorney, Agent, or Firm* — Dennis L. Thomte; Thomte Patent Law Office LLC (57) ABSTRACT

A bale hauler for mounting on a front end loader with the bale hauler having forwardly extending bale teeth which are freely pivotally movable between first and second positions. In the first position, the bale teeth extend forwardly in a horizontal manner from the main frame of the bale hauler. In the second position, the bale teeth extend forwardly and upwardly from the main frame of the bale hauler to enable the bale teeth to be withdrawn from a stacked bale without moving the stacked bale.

1 Claim, 8 Drawing Sheets

ROUND BALE MOVER

CROSS REFERENCE TO RELATED APPLICATION

This is a Continuation-in-part application of application Ser. No. 13/890,700, filed May 9, 2013 entitled ROUND BALE MOVER which is a continuation application of application Ser. No. 12/927,073, filed Nov. 5, 2010 entitled ROUND BALE MOVER, now U.S. Pat. No. 8,444,362, issued May 21, 2013.

BACKGROUND OF THE INVENTION

1. Field of the Invention

This invention relates to a bale mover and more particularly to a bale mover which is mounted on the forward end of a front-end loader mounted on a tractor. More particularly, the bale mover of this invention enables a pair of bales to be moved by the bale mover. Even more particularly, the instant invention relates to a bale mover which enables a pair of bales to be placed on the ground in a spaced-apart side-by-side relationship without tearing or damaging the plastic net wrap on the bales. Even more particularly, the instant invention relates to a bale mover which enables a pair of bales to be placed on a bale carrier, such as a truck or trailer, in a side-by-side manner with the bales being in engagement with one another. Even more particularly, the instant invention relates to a bale mover wherein the bale teeth thereof are freely pivotally movable between a horizontally and forwardly extending position to an upwardly and forwardly extending position.

2. Description of the Related Art

Many types of large, round bale handlers, movers or carriers have been previously provided. Some of the early bale movers utilized a bale spear or tooth which was operatively secured to the three-point pitch of a tractor or which was secured to the forward end of a front-end loader mounted on the tractor. Assuming that the prior art bale tooth extended rearwardly from the tractor, the tractor operator would back up to a bale and drive the tooth into the bale. The tractor operator would then raise the three-point hitch of the tractor to raise the speared bale from the ground. The tractor operator would then drive to a remote location where the bale would be placed on the ground or stacked on other bales for subsequent storage, transport or consumption. As the size of farm tractors has grown, the bale movers have been modified to enable the bale movers to handle two large round bales in a spaced-apart side-by-side relationship.

In Applicant's U.S. Pat. No. 7,753,636, which issued on Jul. 13, 2010, a bale mover is disclosed which enabled a pair of round bales to be vertically movably supported on the forward end of a tractor mounted front-end loader and/or vertically movably supported by a three-point hitch at the rearward end of a tractor. U.S. Pat. No. 7,753,636 is hereby incorporated by reference to complete the disclosure herein if necessary.

However, it has been determined that most persons involved in the hay business desire that the bales be spaced-apart when stored on the ground so that rain or snow will not collect between the bales. A problem associated with the storage of the bales in a spaced-apart manner arises when the bales are to be transported on a bale carrier such as a truck or trailer. If the bales are moved in pairs, the spaced-apart bales, when placed on the bale carrier will have a greater width than if the bales were closely positioned together in an abutting side-by-side relationship.

Applicant's U.S. Pat. No. 8,444,362 represents a vast improvement in the round bale mover art. Applicant's round bale mover disclosed in U.S. Pat. No. 8,444,362, when mounted on the forward end of a front-end loader, enables bales to be stacked on upon the other. It has been found that when the bale spears on the round bale mover are not perfectly horizontally disposed in the bales being placed upon lower bales, it is sometimes difficult to withdraw the bale spears from the bale when the bale has been placed on a bale therebelow. The primary problem associated with the above situation is that the bale spears, if not perfectly horizontally disposed in the bale or bales tend to pull the bale or bales outwardly from the lower bale or bales as the tractor moves away from the stack of bales after the upper bale or bales have been lowered onto the lower bale or bales. U.S. Pat. No. 8,444,362 is hereby incorporated by reference to complete the disclosure herein if necessary. The co-pending application Ser. No. 13/890,700, filed May 9, 2013, is hereby incorporated by reference thereto to complete the disclosure herein if necessary.

SUMMARY OF THE INVENTION

A round bale mover is disclosed for attachment to the forward end of a front-end loader mounted on a tractor. The bale mover of this invention comprises an elongated, transversely and horizontally extending main frame which has first and second ends. An upstanding attachment frame is secured to the main frame between the ends thereof which is adapted to be operatively selectively secured to the forward end of a front-end loader mounted on a tractor. The bale mover will be described hereinafter in the attitude in which it is mounted on the forward ends of the boom arms of a front-end loader mounted on a tractor.

A first upstanding post has its lower end secured to the first end of the main frame and extends upwardly therefrom. A second upstanding post has its lower end secured to the second end of the main frame and extends upwardly therefrom. First and second tubular supports are vertically slidably mounted on the first and second posts respectively which have a forward side, a rearward side, and inner and outer sides. The first and second tubular supports are movable between upper and lower positions with respect to the first and second posts respectively.

A first generally horizontally disposed support member is secured to the rearward side of the first tubular support above the lower end thereof and which has an inner end positioned inwardly of the inner side of the first tubular support and an outer end positioned outwardly of the outer side of the first tubular support. A second generally horizontally disposed support member is secured to the forward side of the first tubular member forwardly of the first support member and which has an inner end positioned inwardly of the inner side of the first tubular support and an outer end positioned outwardly of the outer side of the first tubular support.

An elongated first link, having upper and lower ends, has its upper end pivotally secured, about a horizontal axis, to the outer ends of the first and second support members. An elongated second link, having upper and lower ends, has its upper end pivotally secured, about a horizontal axis, to the inner ends of the first and second support members. An elongated first linkage member, having inner and outer ends, has its outer end pivotally secured, about a horizontal axis, to the lower end of the first link. The inner end of the first linkage member is pivotally secured, about a horizontal axis, to the lower end of the second link. The first linkage member is positioned rearwardly of the first tubular support. An elongated second linkage member, having inner and outer ends, has its outer end pivotally secured, about a horizontal axis, to the lower end of the first link. The inner end of the second linkage member is pivotally secured, about a horizontal axis, to the lower end of the second link. The second linkage member is positioned forwardly of the first tubular support.

An elongated and horizontally disposed first bale tooth support is pivotally secured to the front second linkage and which is freely pivotable between first and second positions. First and second elongated bale teeth, having rearward and forward ends, have their rearward ends secured to the first bale tooth support. When the first bale tooth support is in its first position, the first and second bale teeth extend horizontally forwardly with respect to the second linkage member. When the first bale tooth support is in its second position, the first and second bale teeth extend upwardly and forwardly with respect to the second linkage member.

A first hydraulic cylinder, having a base end and a rod end, is movable between retracted and extended positions and has its base end secured to the first tubular support above the first and second support members. The rod end of the first hydraulic cylinder is pivotally secured to the first link. The retraction of the first hydraulic cylinder causes the first and second bale teeth to be moved laterally outwardly with respect to the main frame. The extension of the first hydraulic cylinder causes the first and second bale teeth to be moved laterally inwardly with respect to the main frame. A second hydraulic cylinder, having a base end and a rod end, has its base end secured to the first post at the upper end thereof and has its rod end secured to the first tubular support. The retraction of the second hydraulic cylinder causes the first tubular support to be moved upwardly on the first post. The extension of the second hydraulic cylinder causes the first tubular support to be moved downwardly on the first post.

A third generally horizontally disposed support member is secured to the rearward side of the second tubular support above the lower end thereof and which has an inner end positioned inwardly of the inner side of the second tubular support and an outer end positioned outwardly of the outer side of the second tubular support. A fourth generally horizontally disposed support member is secured to the forward side of the second tubular member forwardly of the third support member and which has an inner end positioned inwardly of the inner side of the second tubular support and an outer end positioned outwardly of the outer side of the second tubular support.

An elongated third link, having upper and lower ends, has its upper end pivotally secured, about a horizontal axis, to the outer ends of the third and fourth support members. An elongated fourth link, having upper and lower ends, has its upper end pivotally secured, about a horizontal axis, to the inner ends of the third and fourth support members. An elongated third linkage member, having inner and outer ends, has its outer end pivotally secured, about a horizontal axis, to the lower end of the third link. The inner end of the third linkage member is pivotally secured, about a horizontal axis, to the lower end of the fourth link. The third linkage member is positioned rearwardly of the second tubular support. An elongated fourth linkage member, having inner and outer ends, has its outer end pivotally secured, about a horizontal axis, to the lower end of the third link. The inner end of the fourth linkage member is pivotally secured, about a horizontal axis, to the lower end of the fourth link. The fourth linkage member is positioned forwardly of the second tubular support.

An elongated and horizontally disposed second bale tooth support is pivotally secured to the fourth linkage member and is freely pivotable between first and second positions. Third and fourth elongated bale teeth, having rearward and forward ends, have their rearward ends secured to the second bale tooth support. When the second bale tooth support is in its first position, the third and fourth bale teeth extend horizontally forwardly with respect to the fourth linkage member. When the second bale tooth support is in its second position, the third and fourth bale teeth extend upwardly and forwardly with respect to the fourth linkage member.

A third hydraulic cylinder, having a base end and a rod end, is movable between retracted and extended positions and has its base end secured to the second tubular support above the third and fourth support members. The rod end of the third hydraulic cylinder is pivotally secured to the third link. The retraction of the third hydraulic cylinder causes the third and fourth bale teeth to be moved laterally outwardly with respect to the main frame with the extension of the third hydraulic cylinder causing the third and fourth bale teeth to be moved laterally inwardly with respect to the main frame.

A fourth hydraulic cylinder, having a base end and a rod end, has its base end secured to the second post at the upper end thereof and has its rod end secured to the second tubular support. The retraction of the fourth hydraulic cylinder causes the second tubular support to be moved upwardly on the second post. The extension of the fourth hydraulic cylinder causes the second tubular support to be moved downwardly on the second post.

The fact that the first and second bale teeth and the third and fourth bale teeth may be selectively pivotally moved toward one another and away from one another enables the bale mover to pick up a pair of spaced-apart bales and then move those bales towards one another so that they may be loaded onto a truck or trailer for transport.

The fact that the bale teeth are secured to pivotal bale teeth supports enables the bale teeth to pivot upwardly to facilitate the withdrawal of the bale teeth from a stacked bale even though the bale teeth were not inserted into the bale in a perfect horizontal manner and even though the front end loader is not at the perfect height when the bale teeth are to be withdrawn from the stacked bale. The ability of the bale teeth to freely pivot upwardly ensures that the stacked bale will not be moved rearwardly during the withdrawal of the bale teeth from the stacked bale.

It is therefore a principal object of the invention to provide an improved bale mover.

It is a further object of the invention to provide an improved bale mover wherein the bale mover may pick up a pair of horizontally spaced-apart round bales and move the same towards one another so as to be in an abutting side-to-side relationship for positioning on a bale carrier such as a trailer or truck.

A further object of the invention is to provide an improved bale mover wherein the bale teeth thereof are freely pivotally movable between a first horizontally disposed position and a second position wherein the bale teeth extend upwardly and forwardly.

These and other objects will be apparent to those skilled in the art.

DESCRIPTION OF THE PREFERRED EMBODIMENT

The round bale mover of this invention is referred to by the reference numeral 10 which is adapted to be mounted on the forward end of a front-end loader 12 which includes a pair of conventional boom arms 14, each of which is raised or lowered by a hydraulic cylinder 16, or mounted on a three-point hitch at the rearward end of a tractor 17.

Bale mover 10 will be described as if it is mounted on the forward end of the front-end loader 12 mounted on the tractor 17. Bale mover 10 includes an elongated, horizontally extending main frame 18 having a right end 20 and a left end 22, as viewed from the rear of the tractor 17. An upstanding first post 24 is secured to end 20 of main frame 18 and extends upwardly therefrom. An upstanding second post 26 is secured to end 22 of main frame 18 and extends upwardly therefrom. An upstanding central framework 28 is secured to main frame 10 between ends 20 and 22 thereof and is provided with attachment assemblies 30, 31 and 32 at its back side which are adapted to be connected to the forward ends of the boom arms 14 or to the three-point hitch at the rearward end of the tractor.

A first tubular support 34 is vertically slidably mounted on post 24. As seen, the upper end of tubular support 34 dwells in a plane below the upper end of post 24. The base end 36 of hydraulic cylinder 38 is secured to the upper end of post 24. The rod end of hydraulic cylinder 38 is secured to tubular support member 34 at 40.

A first generally horizontally disposed support member 41 is welded to the rearward side of tubular support 34 above the lower end thereof. A support member 42 is positioned at the forward side of tubular support 34 and is secured thereto. Support member 41 will be described as having an inner end 44 and an outer end 46. Support member 42 will be described as having an inner end 48 and an outer end 50.

A first link 52 has its upper end pivotally secured to the outer ends 46 and 50 of support members 41 and 42 respectively by a pivot bolt 54. Link 52 has a collar or sleeve 55 secured thereto at the lower end thereof. A second link 56 has its upper end pivotally secured to the inner ends 44 and 48 of support members 41 and 42 respectively by pivot bolt 58. Link 56 has a collar or sleeve 59 secured thereto at the lower end thereof.

The numeral 60 refers to an elongated linkage having bolt openings 62 and 64 formed therein. The numeral 66 refers to a linkage having a forward side 68, a rearward side 70, an inner end 72 and an outer end 74. Linkage 66 includes an elongated sleeve or pipe 76 which extends rearwardly therefrom adjacent inner end 72. A collar or sleeve 77 embraces the forward end of sleeve 76 and is welded thereto and linkage 66. Linkage 66 also includes an elongated sleeve or pipe 78 which extends rearwardly therefrom adjacent outer end 74. A collar or sleeve 79 embraces the forward end of sleeve 78 and is welded thereto and linkage 66. A bolt 80 is secured to the end of sleeve 76 and a bolt 82 is secured to the end of sleeve 78.

Sleeve 76 is rotatably received in collar 59. Wear plate 84 abuts against the forward side of linkage 66 and is welded to linkage 66. The bolt 80 is received in bolt opening 62 of linkage 60 and held therein by a nut 86. Sleeve 78 is rotatably received in collar 55. Wear plate 92 abuts against the forward side of linkage 66 and is welded to linkage 66. Bolt 82 is received in bolt opening 64 of linkage 60 and is held therein by nut 94. A plate 98 is welded to the inner end 72 of linkage 66 and has a ring-shaped collar 100 secured to the inner side thereof. A plate 102 is welded to the outer end 74 of linkage 66 and has a ring-shaped collar 104 secured to the inner side thereof. A shaft 106 has its ends received in collars 100 and 104 so as to extend therebetween.

The numeral 108 refers to a bale tooth support which is pivotally secured to linkage 66 as will now be described. Bale tooth support 108 includes an elongated and horizontally disposed sleeve 110 which embraces shaft 106 for rotation therewith. The numeral 112 refers to a support plate having an upper end 114 and a lower end 116. Upper end 114 of support plate 112 is welded to sleeve 110. A pair of collars 118 and 120 are welded to the forward side of support plate 112 as seen in the drawings. The rearward ends of bale teeth 122 and 124 are received by collars 118 and 120 respectively and are held therein by set screws. The sleeve 110 and the support plate 112 are pivotally movable with respect to the linkage 66 between first and second positions. When the support plate 112 is in its first position, plate 112 will be in engagement with the forward end of linkage 66 with the bale teeth 122 and 124 extending horizontally forwardly therefrom. The plate 112 is freely pivotal with respect to the linkage 66 so that plate 112 and the bale teeth 122 and 124 thereon may pivot upwardly as will be explained in more detail hereinafter.

The numeral 126 refers to a hydraulic cylinder having its base end pivotally secured to the outer side of tubular support 34 at 128 and has its rod end pivotally secured to bracket 130 at 132. Bracket 130 is secured to link 52. The extension of hydraulic cylinder 126 causes linkage 66 and the bale teeth 122 and 124 to pivotally move laterally inwardly with respect to frame 18. The retraction of hydraulic cylinder 126 causes the linkage 66 and the bale teeth 122 and 124 to pivotally move laterally outwardly with respect to frame 18.

A second tubular support 134 is vertically slidably mounted on post 26. As seen, the upper end of tubular support 134 dwells in a plane below the upper end of post 26. The base end 136 of hydraulic cylinder 138 is secured to the upper end of post 26. The rod end of hydraulic cylinder 138 is secured to tubular support member 134 at 140.

A third generally horizontally disposed support member 142 is welded to the rearward side of tubular support 134 above the lower end thereof. A fourth generally horizontally disposed support member 144 is welded to the forward side of tubular support 134 forwardly of support member 144. Support member 142 will be described as having an inner end 146 and an outer end 148. Support member 144 will be described as having an inner end 150 and an outer end 152. A third link 154 has its upper end pivotally secured to the outer ends 148 and 152 of support members 142 and 144 respectively by a pivot bolt 156. Link 154 has a collar or sleeve 158 secured thereto at the lower end thereof.

A fourth link 160 has its upper end pivotally secured to the inner ends 146 and 150 of support members 142 and 144 respectively by pivot bolt 162. Link 160 has a collar or sleeve 164 secured thereto at the lower end thereof. The numeral 166 refers to an elongated third linkage having a bolt opening 168 and 170 formed therein. The numeral 172 refers to a fourth linkage having a forward side 174, a rearward side 176, an outer end 178 and an inner end 180. Linkage 172 includes an elongated sleeve or pipe 182 which extends rearwardly therefrom adjacent outer end 178. A collar or sleeve 183 embraces sleeve 182 and is welded thereto and linkage 172. A bolt 185 is secured to the end of sleeve 182. Linkage 172 also includes an elongated sleeve or pipe 184 which extends rearwardly therefrom adjacent inner end 180. A collar or sleeve 186 embraces sleeve 184 and is welded thereto and to linkage 172. A bolt 188 is welded to the end of sleeve 184.

Plate 190 abuts against the forward side of linkage 172 and is welded to linkage 172. The bolt 185 is received in bolt opening 168 of linkage 166 and held therein by nut 192.

Plate 198 abuts against the forward end of linkage 172 and is welded to linkage 172. The bolt 188 is received in bolt opening 170 of linkage 166 and held therein by nut 200. A plate 202 is welded to the outer end 178 of linkage 172 and has a ring-shaped collar 204 secured to the inner side thereof. A plate 206 is welded to the outer end 180 of linkage 172 and has a ring-shaped collar 208 secured to the inner side thereof. A shaft 210 has its ends received in collars 204 and 208 so as to extend therebetween.

Figure 1:
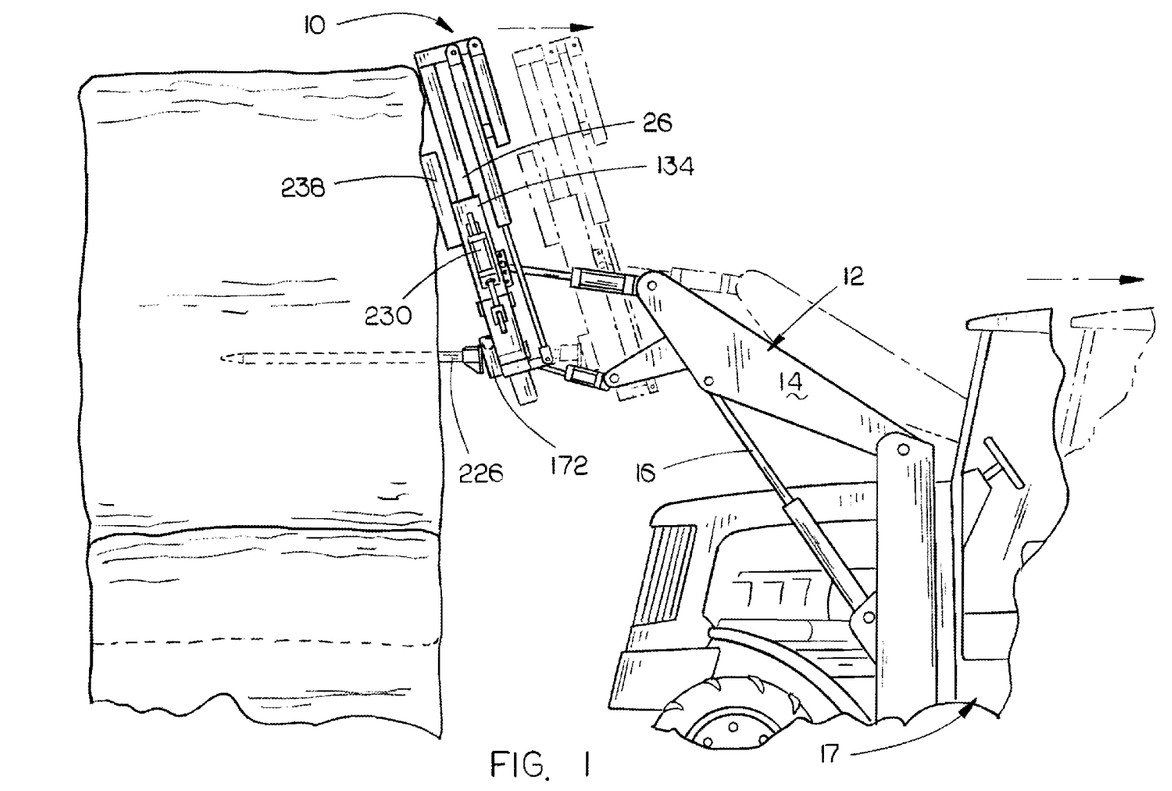
FIG. 1 is a partial side view illustrating the manner in which the bale hauler of this invention is withdrawn from a bale after the bale has been stacked upon another bale and which shows the bale teeth having been pivoted with respect to the main frame of the bale hauler.
Figure 2:
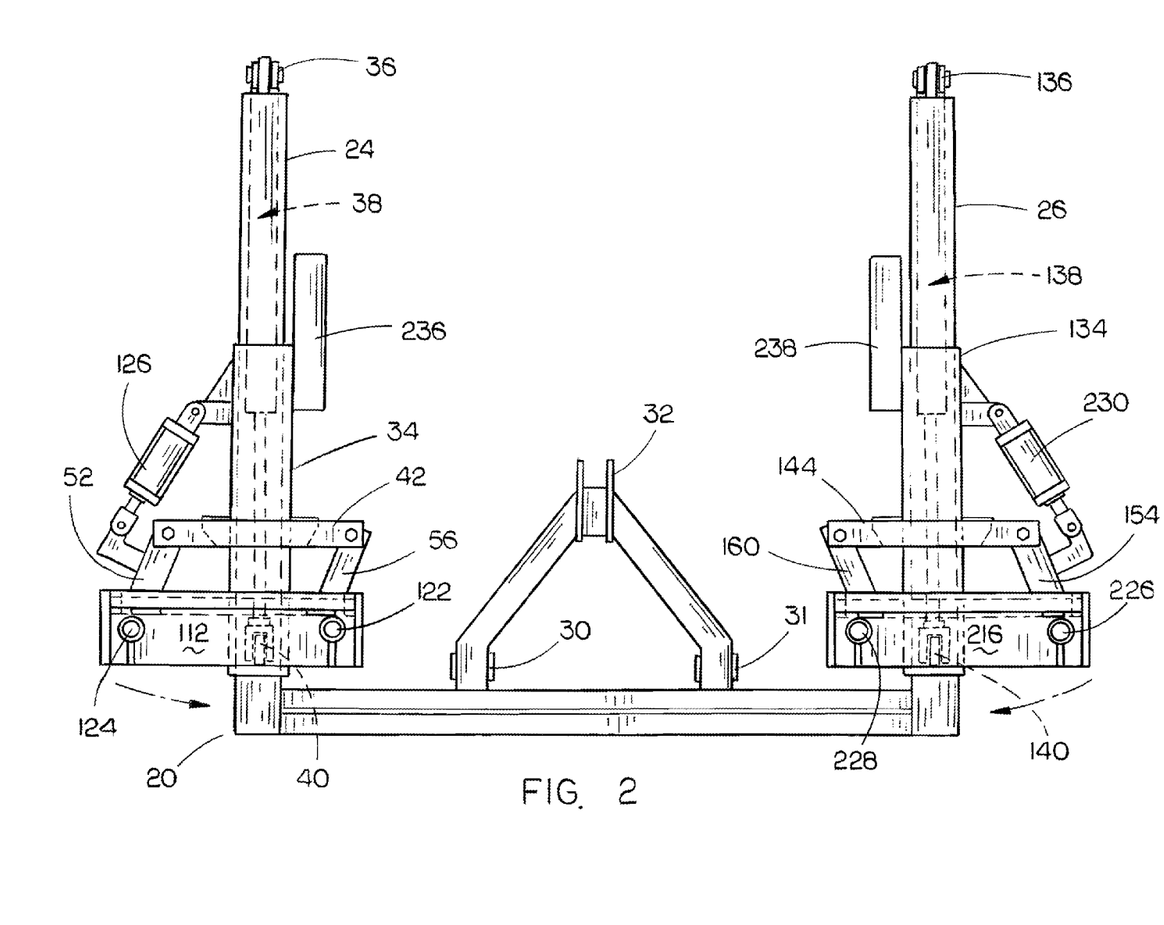
FIG. 2 is a front elevational view of the bale hauler of this invention.
Figure 3:
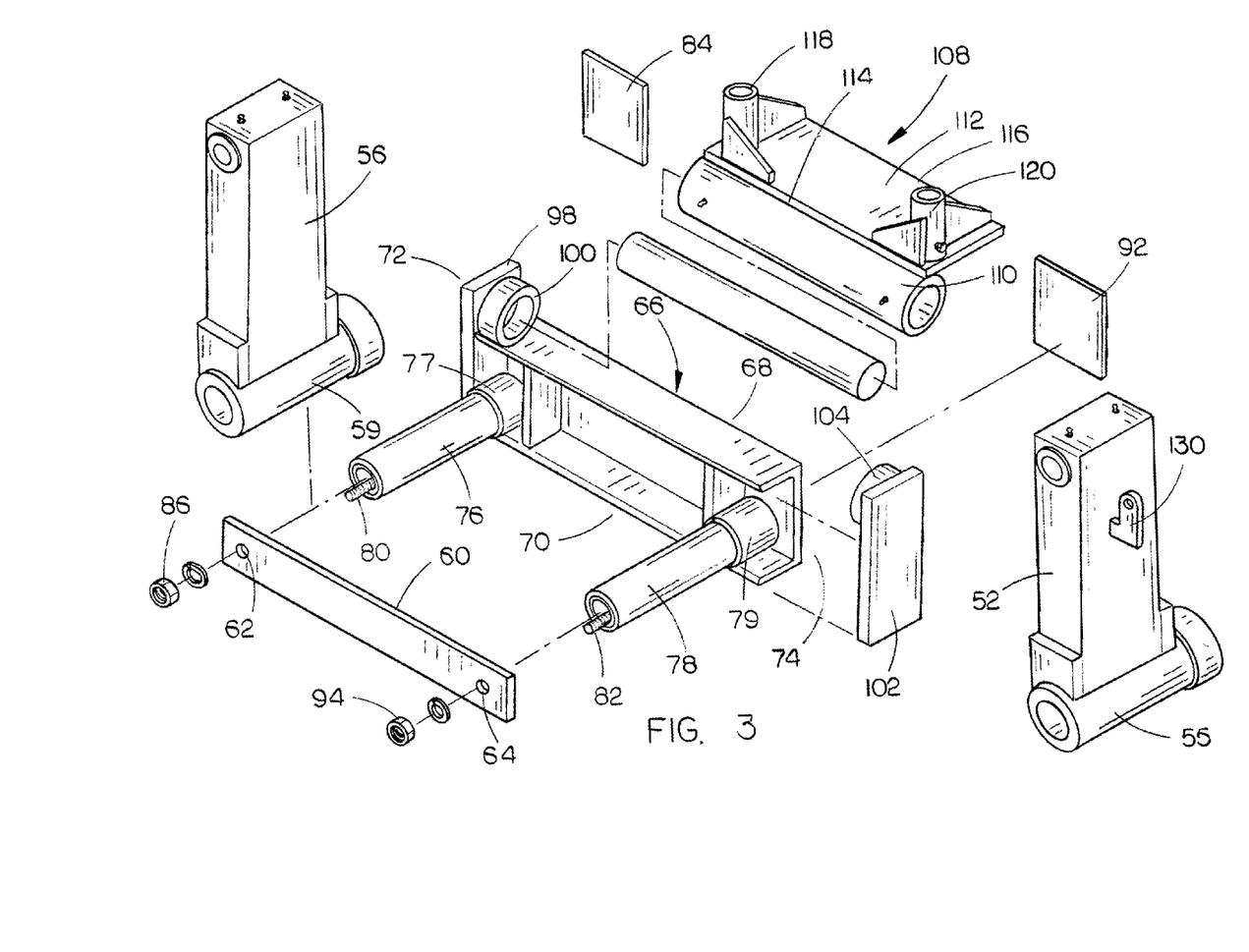
FIG. 3 is a partial exploded perspective view of the bale hauler of this invention which is positioned at the right side of the main frame of the bale hauler.
Figure 4:
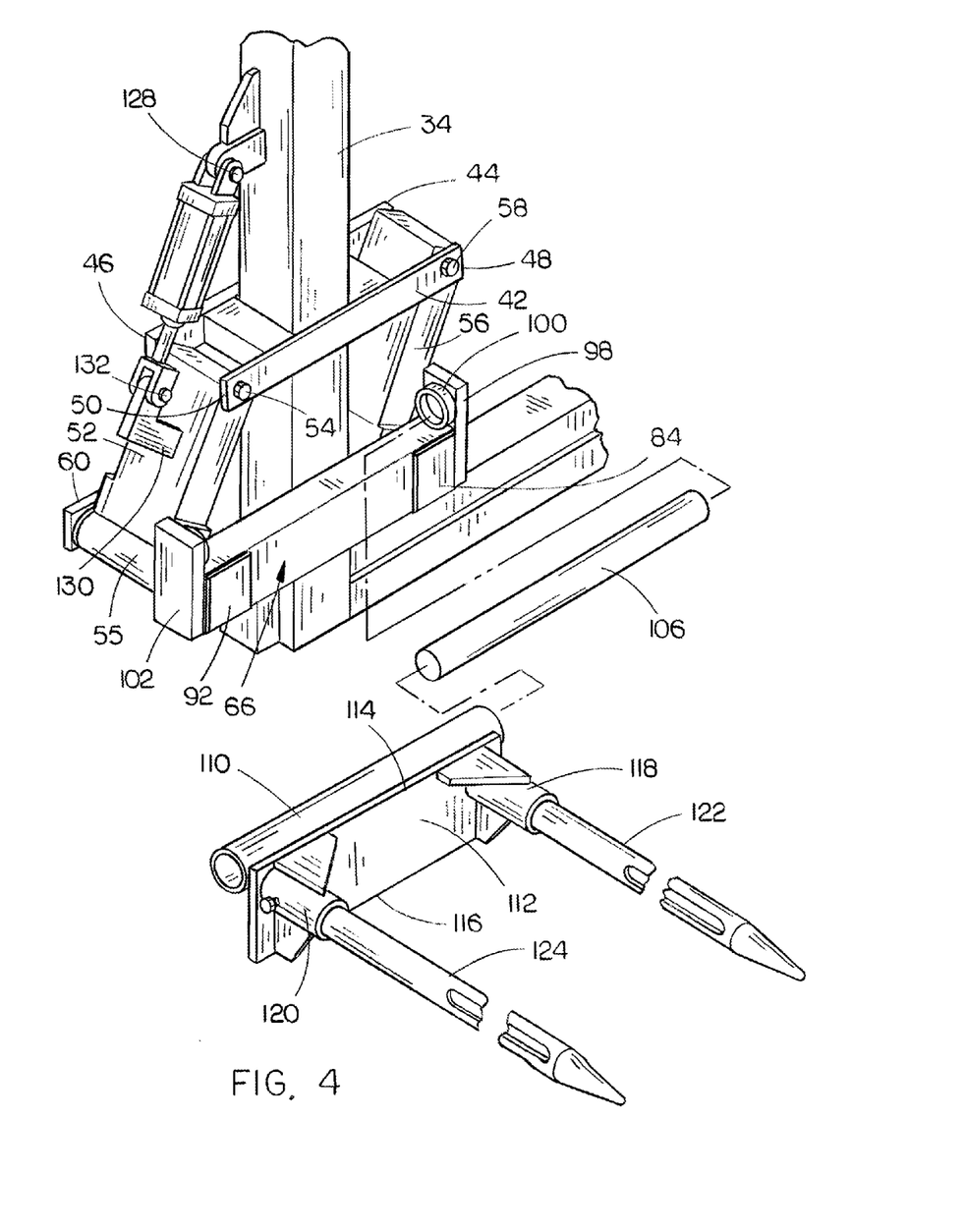
FIG. 4 is a partial exploded perspective view illustrating a portion of the bale hauler which is positioned at the right side of the main frame of the bale hauler.
Figure 5:
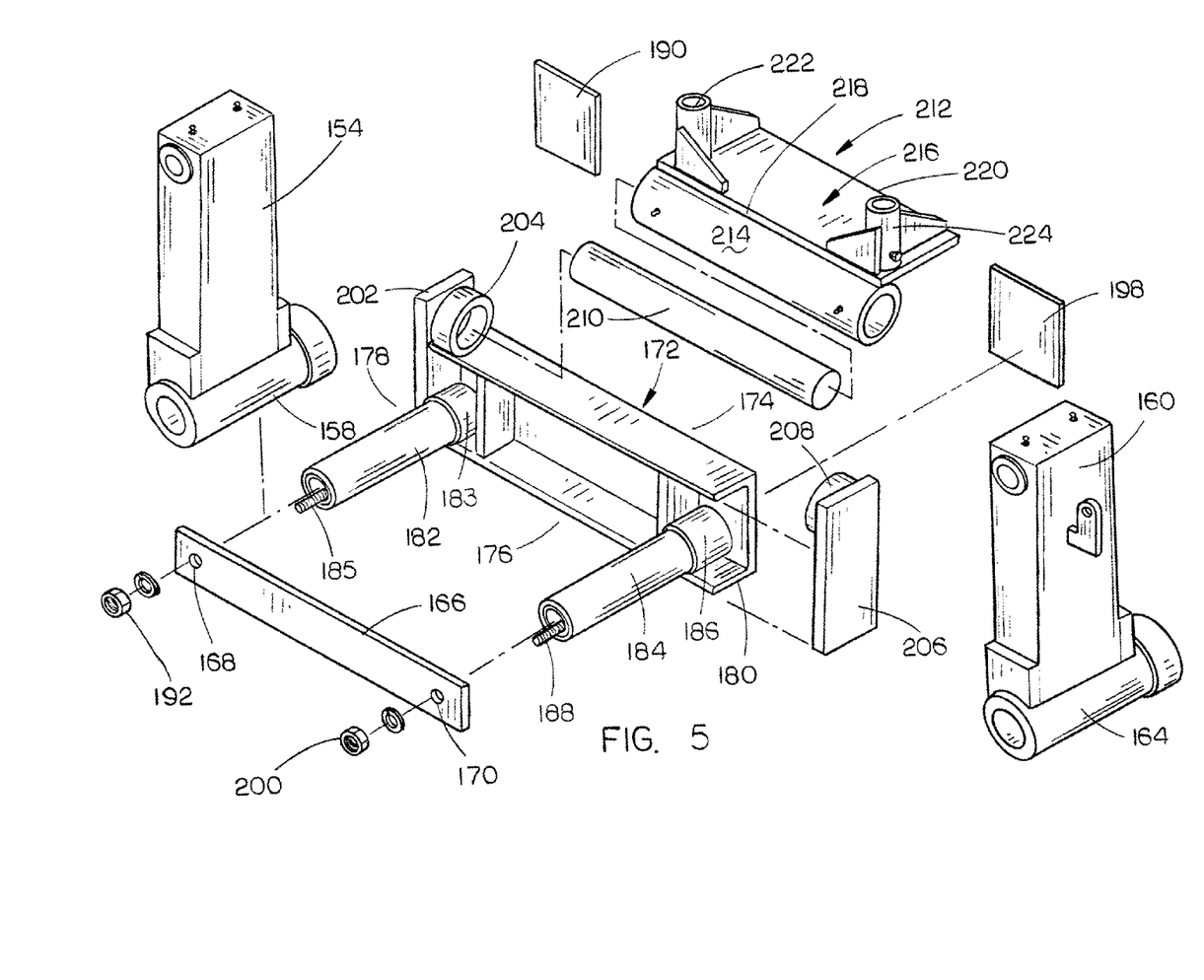
FIG. 5 is a partial perspective view of the bale hauler of this invention which is positioned at the left side of the main frame of the bale hauler.
Figure 6:
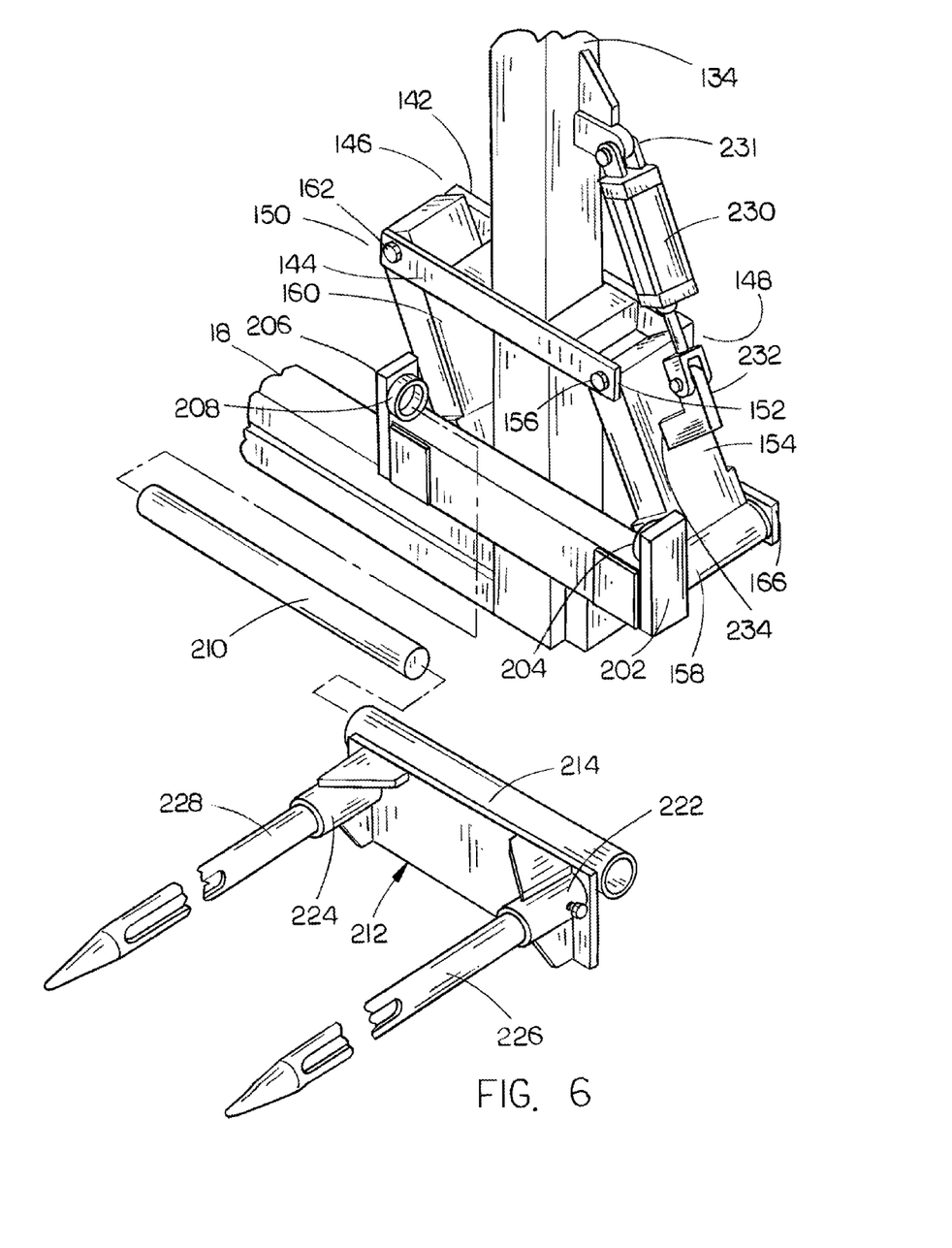
FIG. 6 is a view similar to FIG. 3 except that it illustrates a portion of the bale hauler at the left side of the main frame of the bale hauler.
Figure 7:
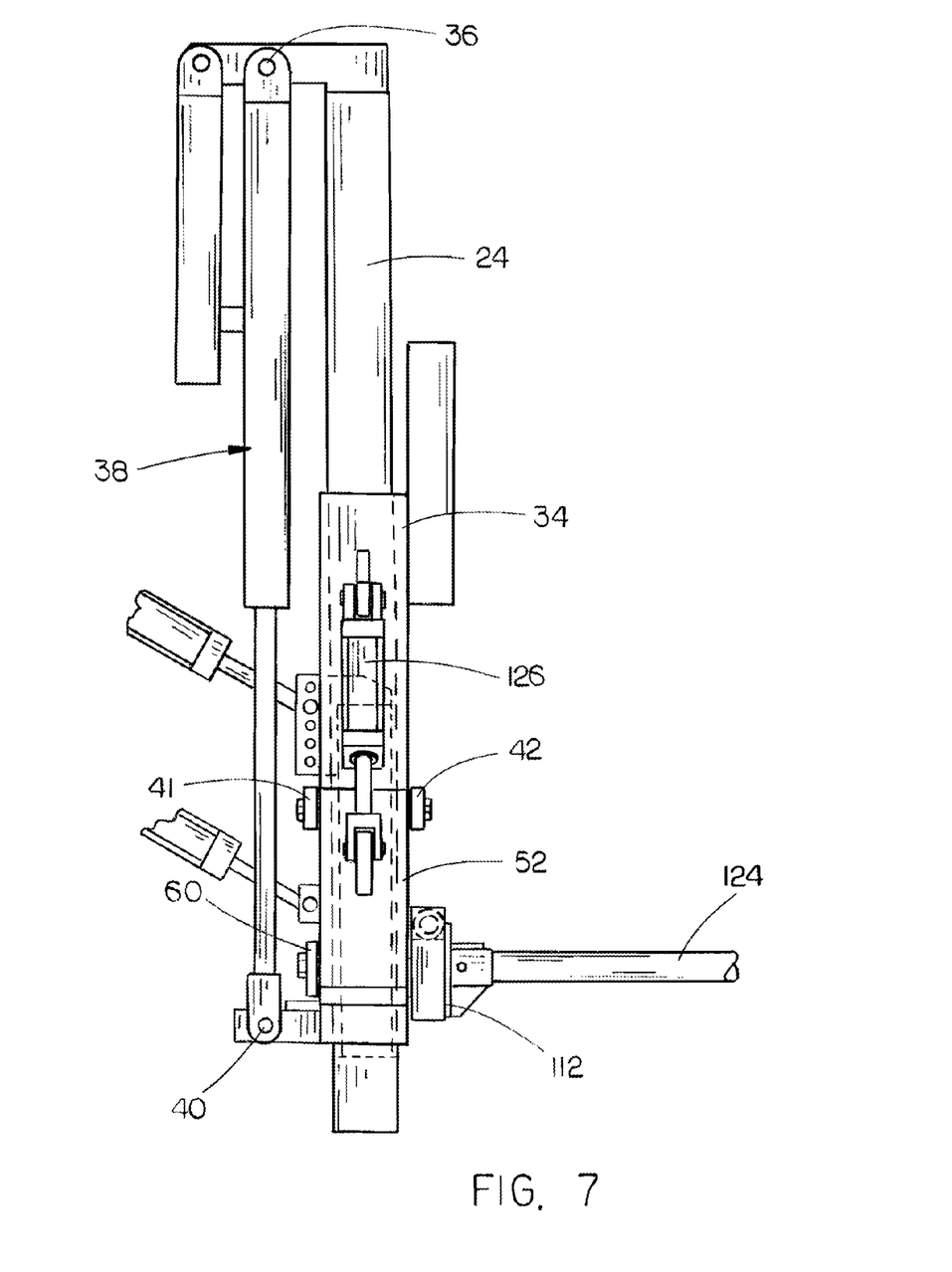
FIG. 7 is a side elevational view of the right side of the bale hauler of this invention.
Figure 8:
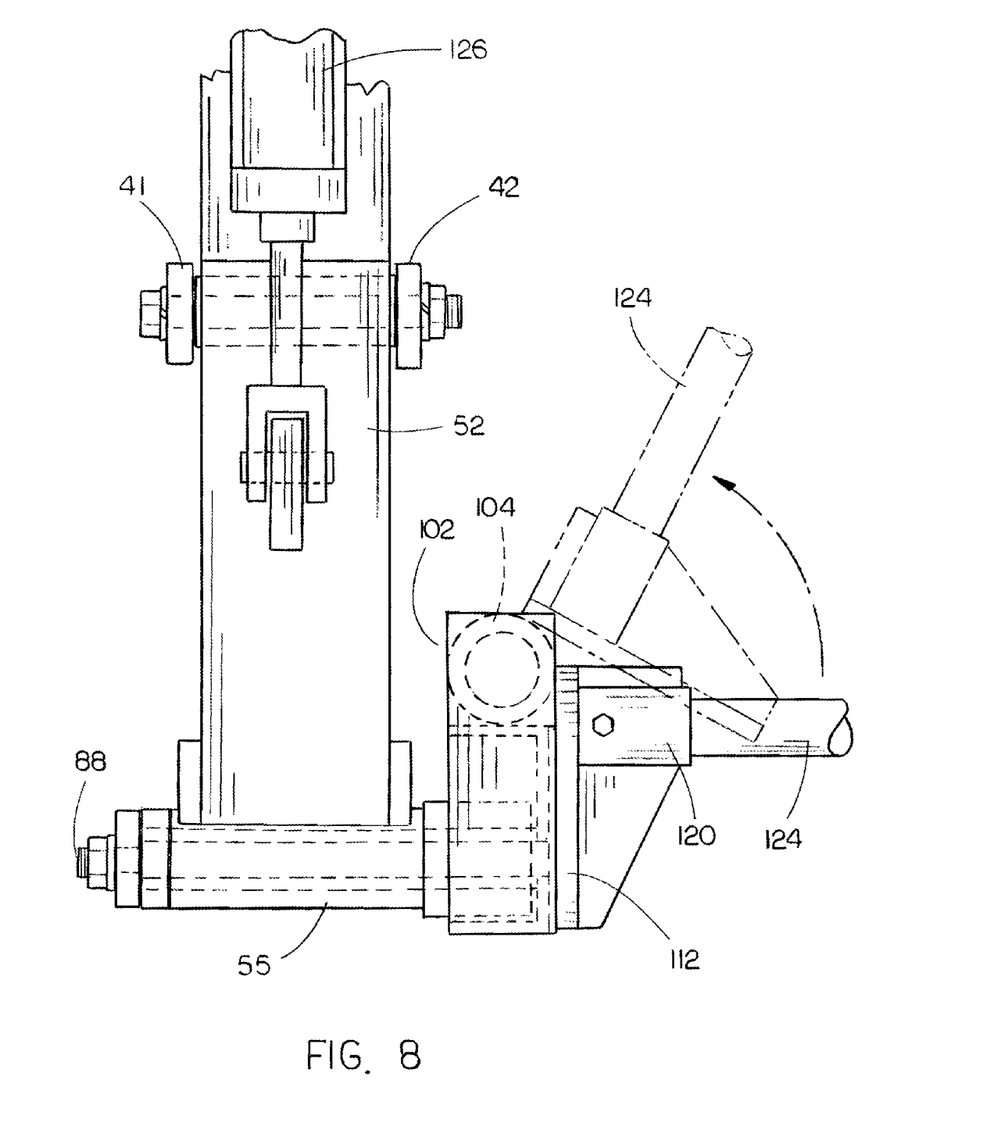
FIG. 8 is a partial side elevational view illustrating the manner in which the bale teeth may pivotally move upwardly with respect to the main frame of the bale hauler.

The numeral 212 refers to a second bale tooth support which is pivotally secured to linkage 172 as will now be described. Bale tooth support 212 includes an elongated and horizontally disposed sleeve 214 which embraces shaft 210 for rotation therewith. The numeral 216 refers to a support plate having an inner end 218 and an outer end 220. Inner end 218 of support plate 216 is welded to sleeve 214. A pair of collars 222 and 224 are welded to the forward side of support plate 216 as seen in FIG. 5. The rearward ends of bale teeth 226 and 228 are received by collars 222 and 224 respectively and are held therein by set screws. The sleeve 224 and the support plate 216 are pivotally movable with respect to linkage 172 between first and second positions. When the support plate 216 is in its first position, plate 216 will be in engagement with the forward side of linkage 172 with the bale teeth 226 and 228 extending horizontally forwardly therefrom. The plate 216 is freely pivotal with respect to the linkage so that plate 216 and bale teeth 226 and 228 may pivot upwardly with respect to the linkage 172. The numeral 230 refers to a hydraulic cylinder having its base end pivotally secured to the outer side of tubular support 138 and has its rod end pivotally secured to bracket 232 at 234. Bracket 232 is secured to link 154. The extension of hydraulic cylinder 230 causes linkage 172 and the bale teeth 226 and 228 to pivotally move laterally inwardly with respect to frame 18. The retraction of hydraulic cylinder 230 causes linkage 172 and the bale teeth 226 and 238 to pivotally move laterally outwardly with respect to frame 18.

The fact that the bale teeth may freely pivotally move upwardly from the first position to a second position enables the bale teeth to be withdrawn from a stacked bale without moving the stacked bale from its stacked position. Even though the bale teeth may not be perfectly inserted into a bale in a horizontal manner, the bale teeth may be withdrawn from the bale without pulling the stacked bale outwardly since the bale teeth may freely pivot from the first position to the second position.

It can therefore be seen that the invention accomplishes all of the stated objectives.

I claim:
1. A round bale mover for attachment to a front end loader mounted on a tractor, comprising:
an elongated transversely and horizontally extending main frame having first and second ends;
an attachment frame means secured to said main frame configured to be operatively selectively secured to the front end loader;
an upstanding first post having upper and lower ends;
said lower end of said first post being secured to said main frame at said first end thereof;
an upstanding second post having upper and lower ends;
said lower end of said second post being secured to said main frame at said second end thereof;
a first tubular support having an upper end, a lower end, an inner side, an outer side, a forward side and a rearward side;
said first tubular support being selectively vertically slidably mounted on said first post;
said first post having a greater length than said first tubular support;
a first hydraulic cylinder having a base end and a rod end;
said base end of said first hydraulic cylinder being secured to said first post at said upper end of said first post;
said rod end of said first hydraulic cylinder being secured to said first tubular support;
the retraction of said first hydraulic cylinder causing said first tubular support to be vertically moved upwardly with respect to said first post;
the extension of said first hydraulic cylinder causing said first tubular support to be vertically moved downwardly with respect to said first post;
a second tubular support having an upper end, a lower end, an inner side, an outer side, a forward side and a rearward side;
said second tubular support being selectively vertically slidably mounted on said second post;
said second post having a greater length than said second tubular support;
a second hydraulic cylinder having a base end and a rod end;
said base end of said second hydraulic cylinder being secured to said second post at said upper end of said second post;
said rod end of said second hydraulic cylinder being secured to said second tubular support;
the retraction of said second hydraulic cylinder causing said second tubular support to be vertically moved upwardly with respect to said second post;
the extension of said second hydraulic cylinder causing said second tubular support to be vertically moved downwardly with respect to said second post;
a generally horizontally disposed first support member secured to said rearward side of said first tubular support above the lower end of said first tubular support;
said first support member having an inner end positioned inwardly of said inner side of said first tubular support;
said first support member having an outer end positioned outwardly of said first tubular support;
a generally horizontally disposed second support member secured to said forward side of said first tubular support;
said second support member having an inner end positioned inwardly of said inner side of said first tubular support;
said second support member having an outer end positioned outwardly of said outer side of said first tubular support;

an elongated first link having upper and lower ends;
said upper end of said first link being pivotally secured to outer ends of said first and second support members;
an elongated second link having upper and lower ends;
said upper end of said second link being pivotally secured to said inner ends of said first and second support members;
an elongated first linkage having inner and outer ends;
said outer end of said first linkage being pivotally secured about a horizontal axis to said first link at said lower end thereof;
said inner end of said first linkage being pivotally secured, about a horizontal axis, to said second link at said lower end thereof;
an elongated second linkage having inner and outer ends;
said inner end of said second linkage being pivotally secured, about a horizontal axis, to said lower end of said second link;
said outer end of said second linkage being pivotally secured, about a horizontal axis, to said lower end of said first link;
a third hydraulic cylinder having a base end and a rod end;
said base end of said third hydraulic cylinder being pivotally secured to said first tubular support;
said rod end of said third hydraulic cylinder being pivotally secured to said first link;
a first bale tooth support pivotally secured, about a horizontal axis, to said second linkage;
said first bale tooth support being freely pivotal with respect to said second linkage between a first position and a second position;
first and second elongated bale teeth having rearward and forward ends;
said rearward ends of said first and second bale teeth being secured to said first bale tooth support for movement therewith;
said first and second bale teeth extending horizontally forwardly with respect to said second linkage when said first bale tooth support is in said first position;
said first and second bale teeth extending forwardly and upwardly with respect to said second linkage when said first bale tooth support is in said second position;
the extension of said third hydraulic cylinder causing said second linkage, said first bale tooth support and said first and second bale teeth to be moved laterally inwardly with respect to said main frame;
the retraction of said third hydraulic cylinder causing said second linkage, said first bale tooth support and said first and second bale teeth to be moved laterally outwardly with respect to said main frame;
a generally horizontally disposed third support member secured to said rearward side of said second tubular support above the lower end of said second tubular support;
said third support member having an inner end positioned inwardly of said inner side of said second tubular support;
said third support member having an outer end positioned outwardly of said second tubular support;
a generally horizontally disposed fourth support member secured to said forward side of said second tubular support;
said fourth support member having an inner end positioned inwardly of said inner side of said second tubular support;
said fourth support member having an outer end positioned outwardly of said outer side of said second tubular support;
an elongated third link having upper and lower ends;
said upper end of said third link being pivotally secured to outer ends of said third and fourth support members;
an elongated fourth link having upper and lower ends;
said upper end of said fourth link being pivotally secured to said inner ends of said third and fourth support members;
an elongated third linkage having inner and outer ends;
said outer end of said third linkage being pivotally secured about a horizontal axis to said third link at said lower end thereof;
said inner end of said third linkage being pivotally secured, about a horizontal axis, to said fourth link at said lower end thereof;
an elongated fourth linkage having inner and outer ends;
said inner end of said fourth linkage being pivotally secured, about a horizontal axis, to said lower end of said fourth link;
said outer end of said fourth linkage being pivotally secured, about a horizontal axis, to said lower end of said third link;
a fourth hydraulic cylinder having a base end and a rod end;
said base end of said fourth hydraulic cylinder being pivotally secured to said second tubular support;
said rod end of said fourth hydraulic cylinder being pivotally secured to said third link;
a second bale tooth support pivotally secured, about a horizontal axis, to said fourth linkage;
said second bale tooth support being freely pivotal with respect to said fourth linkage between a first position and a second position;
third and fourth elongated bale teeth having rearward and forward ends;
said rearward ends of said third and fourth bale teeth being secured to said second bale tooth support for movement therewith;
said third and fourth bale teeth extending horizontally forwardly with respect to said fourth linkage when said second bale tooth support is in said first position;
said third and fourth bale teeth extending forwardly and upwardly with respect to said fourth linkage when said second bale tooth support is in said second position;
the extension of said fourth hydraulic cylinder causing said fourth linkage, said second bale tooth support and said third and fourth bale teeth to be moved laterally inwardly with respect to said main frame;
the retraction of said fourth hydraulic cylinder causing said fourth linkage, said second bale tooth support and said third and fourth bale teeth to be moved laterally outwardly with respect to said main frame.

\* \* \* \* \*